United States Patent
Quarre et al.

(10) Patent No.: US 8,347,275 B2
(45) Date of Patent: Jan. 1, 2013

(54) OPENGL TO OPENGL/ES TRANSLATOR AND OPENGL/ES SIMULATOR

(75) Inventors: Christophe Quarre, Shanghai (CN);
Haizhen Li, Ivry sur Seine (FR);
Chester Chan Kwok-Kee, North Point (CN)

(73) Assignee: STMicroelectronics, Inc., Coppell, TX (US)

( * ) Notice: Subject to any disclaimer, the term of this patent is extended or adjusted under 35 U.S.C. 154(b) by 1615 days.

(21) Appl. No.: 11/788,395

(22) Filed: Apr. 19, 2007

(65) Prior Publication Data

US 2007/0257924 A1    Nov. 8, 2007

(30) Foreign Application Priority Data

Apr. 20, 2006   (CN) .......................... 2006 1 0077518

(51) Int. Cl.
*G06F 9/45* (2006.01)
*G06F 9/44* (2006.01)

(52) U.S. Cl. ......... 717/136; 717/105; 717/109; 717/113

(58) Field of Classification Search .................. None
See application file for complete search history.

(56) References Cited

U.S. PATENT DOCUMENTS

| | | | |
|---|---|---|---|
| 7,103,873 B2 * | 9/2006 | Tanner et al. | 717/109 |
| 8,006,236 B1 * | 8/2011 | Kilgard et al. | 717/136 |
| 8,042,094 B2 * | 10/2011 | Napoli et al. | 717/109 |
| 8,171,461 B1 * | 5/2012 | Kilgard et al. | 717/136 |
| 2006/0107250 A1 * | 5/2006 | Tarditi et al. | 717/105 |
| 2007/0256054 A1 * | 11/2007 | Byrne et al. | 717/113 |
| 2008/0201695 A1 * | 8/2008 | Zhou | 717/136 |
| 2010/0318959 A1 * | 12/2010 | Rowan et al. | 717/105 |
| 2011/0209117 A1 * | 8/2011 | Agustin et al. | 717/109 |

OTHER PUBLICATIONS

"OpenGL Index in Alphabetic Order", OpenGL Manual Page, Oct. 2002, 538 pages, <http://users.informatik.uni-halle.de/~schenzel/ws02/opengl/manpage.pdf>.*
DyLogic, DOGLESS Research Synthesis, 2004, 13 pages, <sourceforge.net/projects/dogless>.*
Nikolove et al., Gaze-contingent display using texture mapping and OpenGL: system and applications, Mar. 2004, 8 pages, <http://delivery.acm.org/10.1145/970000/968366/p11-nikolov.pdf>.*
Nadalutti et al., Rendering of X3D content on mobile devices with OpenGL ES, Apr. 2006, 9 pages, <http://delivery.acm.org/10.1145/1130000/1122594/p19-nadalutti.pdf>.*
Oh et al., Implementation of OpenVG 1.0 using OpenGL ES, Sep. 2007, 3 pages, <http://delivery.acm.org/10.1145/1380000/1378027/p326-oh.pdf>.*
F. Andreoli, "Dylogic OpenGL/ES Simulator—version alpha," Jan. 2004; http://sourceforge.net/proiects/dogless.

(Continued)

*Primary Examiner* — Thuy Dao
(74) *Attorney, Agent, or Firm* — Gardere Wynne Sewell LLP

(57) ABSTRACT

To address a desire to run 3D applications based on the OpenGL standard on OpenGL|ES mobile devices such as cellular telephones, one must be able to translate function calls between OpenGL and OpenGL|ES. In supporting this translation, and so as to ensure proper data state for the continued execution of the OpenGL application, global GL states which might be changed by an OpenGL|ES function used during translation are stored. The OpenGL to OpenGL|ES translation is then effectuated by substituting appropriate OpenGL|ES commands for OpenGL commands, and passing OpenGL|ES APIs for OpenGL|ES implementation. Thereafter, the global GL states which were previously saved are restored such that the performed translation does not adversely impact continued execution of the OpenGL configured application. This translation process supports OpenGL to OpenGL|ES translation with respect to a number of OpenGL APIs as well as some known extensions.

19 Claims, 10 Drawing Sheets

OTHER PUBLICATIONS

A. Munshi, OpenGL® ES, Common Profile Specification 2.0, Version 1.06 (Annotated), The Khronos Group Inc., Copyright © 2002-2005.

Pan, Zhigeng, et al: "Real-time Translator from OpenGL to OpenGL ES for Mobile Devices," State Key Lab of CAD&CG, Zhejiang University, Hangzhou, CN, ICAT 2004 (4 pages).

* cited by examiner

```
glBegin(GL_QUADS);
    glNormal3f(0.0, 0.0, 1.0);
    glColor3f(1.0, 1.0, 1.0);
    glTexCoord2f(0.0, 0.0); glVertex3f(-1.0, -1.0, 1.0);
    glTexCoord2f(1.0, 0.0); glVertex3f(1.0, -1.0, 1.0);
    glTexCoord2f(1.0, 1.0); glVertex3f(1.0, 1.0, 1.0);
    glTexCoord2f(0.0, 1.0); glVertex3f(-1.0, 1.0, 1.0);
glEnd();
```

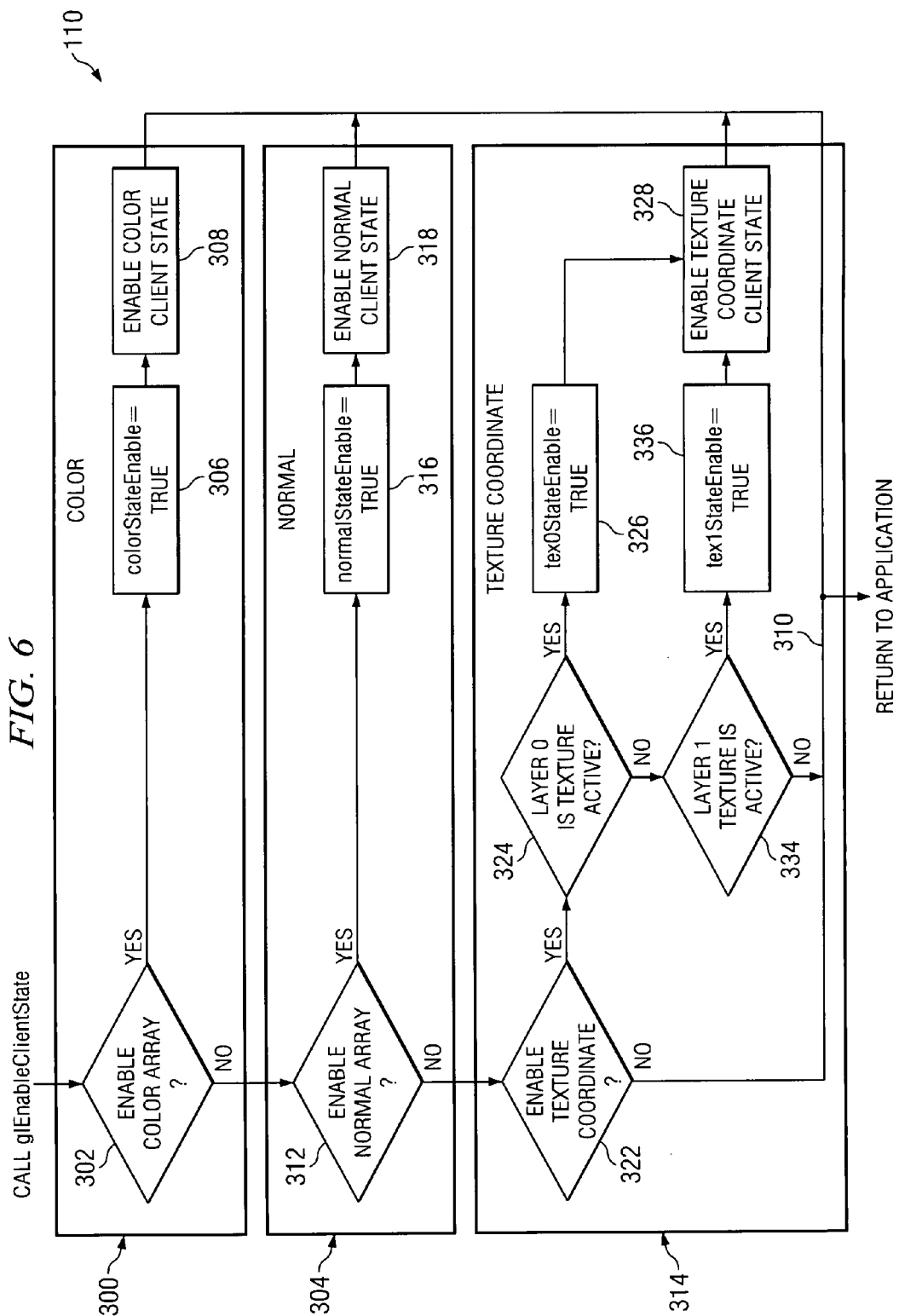

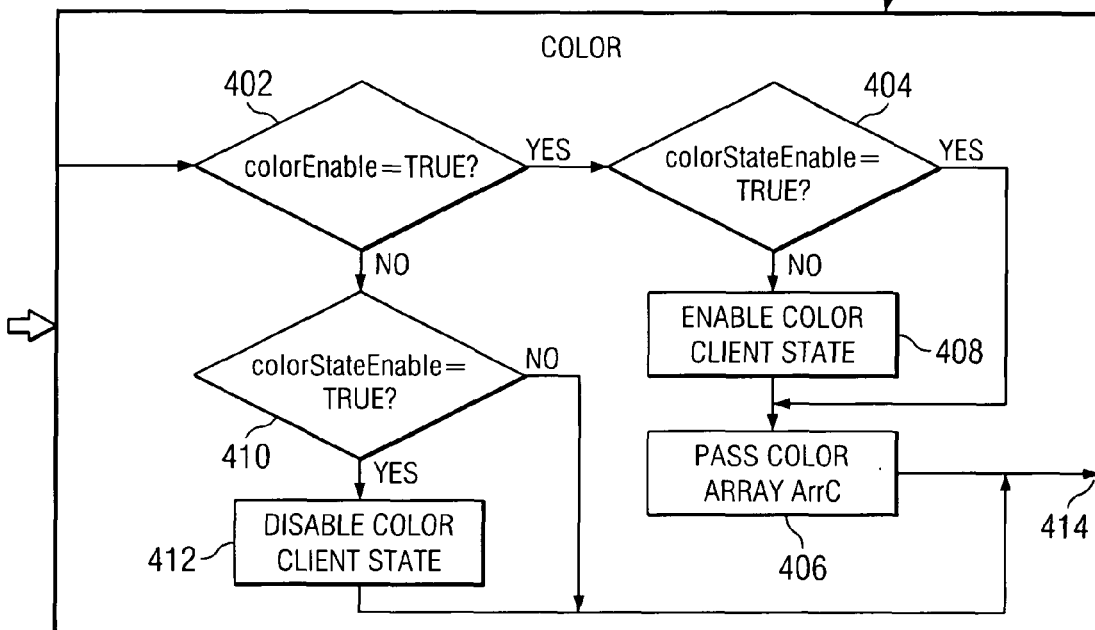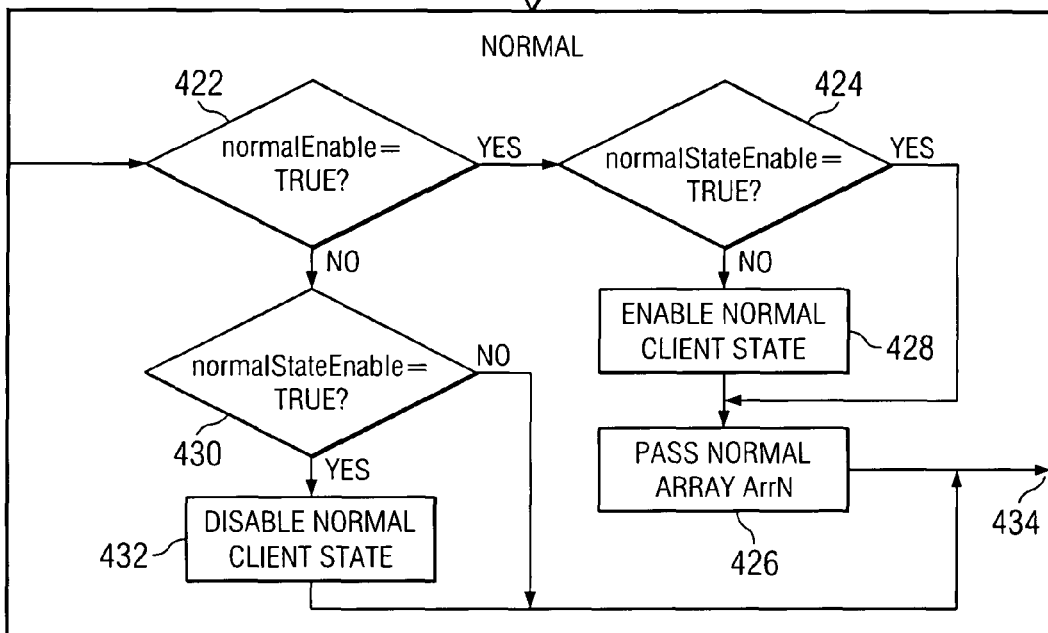
FIG. 10A

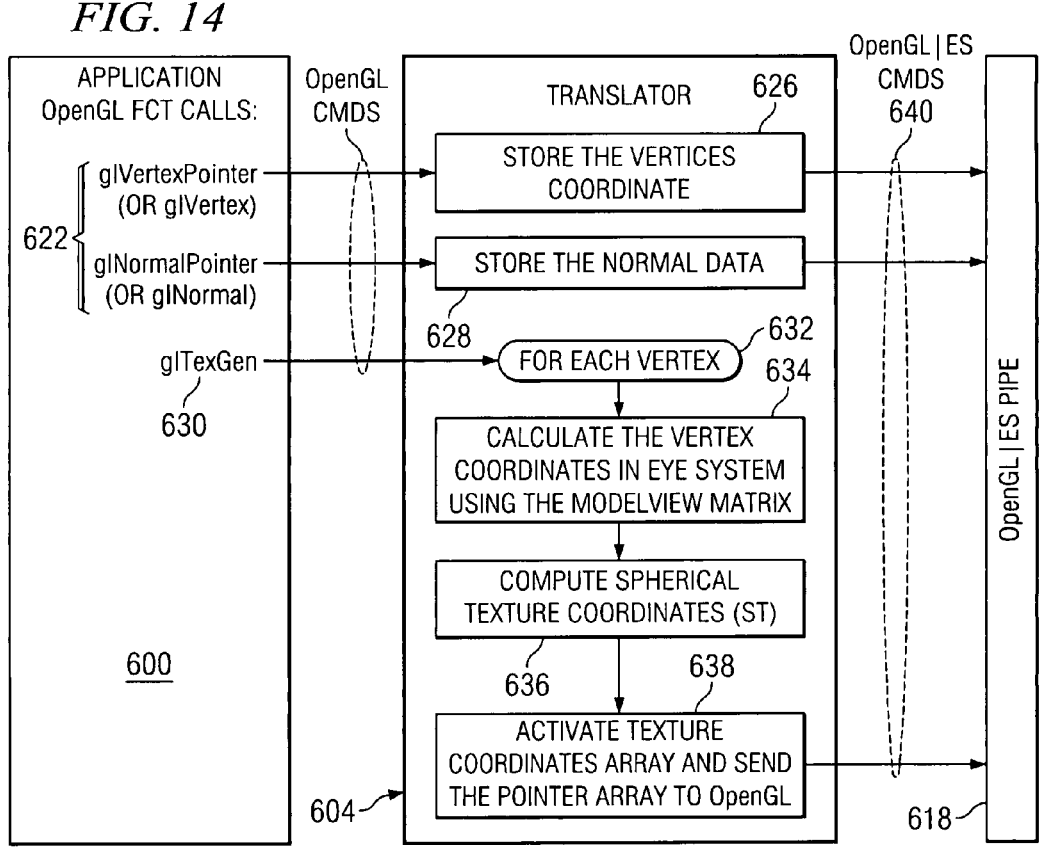
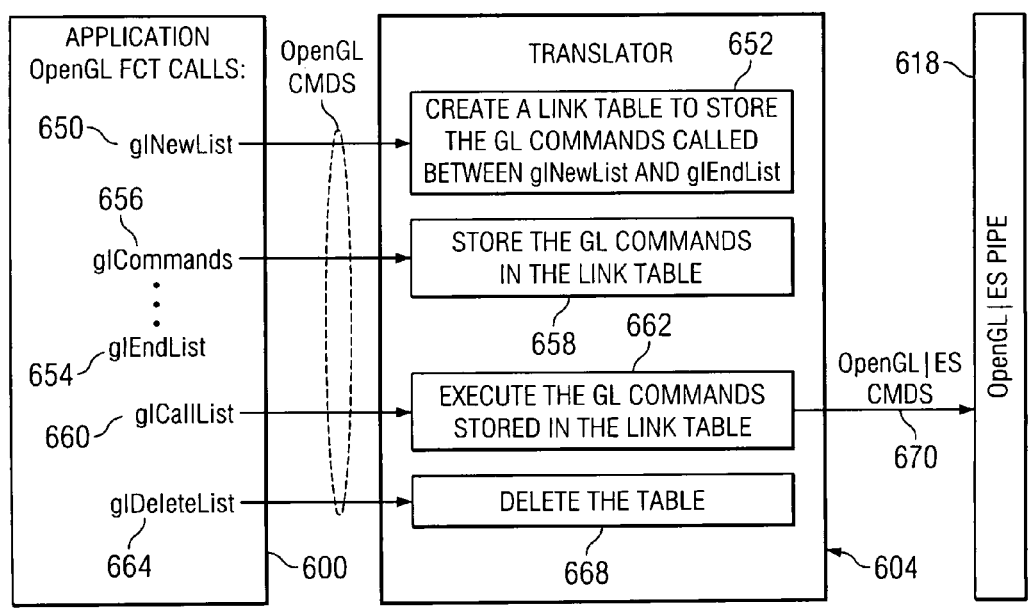

OPENGL TO OPENGL/ES TRANSLATOR AND OPENGL/ES SIMULATOR

PRIORITY CLAIM

This application is a translation of and claims priority from Chinese Patent Application No. 200610077518.0 of the same title filed Apr. 20, 2006, the disclosure of which is hereby incorporated by reference herein for all purposes.

BACKGROUND OF THE INVENTION

1. Technical Field of the Invention

The present invention relates to three dimensional (3D) application development for mobile devices (such as G4M-type devices) using the OpenGL|ES graphic standard and, in particular, to a translator which functions to allow running of an OpenGL application on top of an OpenGL|ES implementation.

2. Description of Related Art

The 3D graphic standard OpenGL is commonly used for graphics rendering in personal computer (PC) environments. The graphic standard OpenGL|ES is a lite version of the OpenGL standard which targets mobile devices such as mobile phones and other handsets. Although the OpenGL|ES standard is established, a problem exists in that the OpenGL|ES standard is so new that there are very few 3D applications based on that standard which are available in the market. There do exist, however, a sizable number of legacy applications which were written for the personal computer in OpenGL. Until more suitable OpenGL|ES standard-based applications appear on the market, consumers would like an opportunity to run the many OpenGL standard-based applications on their mobile devices. The differences between OpenGL and OpenGL|ES, however, preclude this from happening to any degree of consumer satisfaction, especially with respect to graphically intensive applications such as 3D games.

Among all the primary OpenGL APIs (Application Programming Interfaces, sometimes referred as commands) only about 10% are retained in OpenGL|ES with no changes. About 50% of the OpenGL APIs are retained in OpenGL|ES with minor changes such as allowing fewer, different or new parameters. The rest of the primary OpenGL APIs are not supported in OpenGL|ES at all. With respect to an OpenGL based application and an OpenGL|ES rendering engine implementation, for the APIs of the first category, which are fully supported by OpenGL|ES, the related commands sent by the OpenGL application can be sent straight forward to the OpenGL|ES graphic rendering implementation. However, with respect to the restricted support OpenGL commands, for example where only restricted parameters are supported, and the not supported at all OpenGL commands, some translation work is necessary to be able to run the application properly on the OpenGL|ES implementation.

Dylogic provides a translator program called "DOGLESS" which translates OpenGL calls into OpenGL|ES and forwards them to the underlying OpenGL|ES implementation DLL. See, http://sourceforge.net/projects/dogless. In order to run an OpenGL application over an OpenGL|ES implementation, Dylogic's translator intercepts in runtime OpenGL commands not supported in OpenGL|ES, and tries to translate these commands by using supported commands. This functionality is depicted in the flow diagram of FIG. 1. With this solution, some OpenGL applications and games, including graphically intensive games like Quake 2, can run properly over the OpenGL|ES implementation.

The Dylogic translator of FIG. 1, however, is a proof-of-concept product and translates only a very few number of the OpenGL APIs. Furthermore some of these translations are game dependent as will be discussed in more detail below. For example, the Dylogic translator is known to work somewhat well with the game Quake 2, but not with other games.

To submit the vertex data (coordinates, color, normal . . . ) of a polygon to render, OpenGL supports two ways: a) the "immediate mode" where the data are sent vertex by vertex between two GL commands: the glBegin/glEnd paradigm (an example is shown FIG. 5); or b) using vertex array for each data type. In OpenGL|ES, however, only the vertex array method is supported. Vertex arrays are more efficient since all the primitive data is sent in a single command. The Dylogic translator tool focuses almost exclusively on the translation of the glBegin/glEnd paradigm. This is shown in FIG. 2.

The Dylogic translator solution translates the glBegin/glEnd paradigm to vertex arrays as follows: in a glBegin command, all vertex arrays are activated by using command glEnableClientState (which enables all arrays for color, normal vertex, texture coordinate). This effectuates a transform of complicated primitives into triangles. Then the data for vertex arrays are prepared by assembling the data specified in commands glVertex, glColor, glTexCoord and glNormal. Next, with the glEnd command, the vertex arrays are passed to implementation and the object is rendered using API glDrawArray.

What can easily be observed from a review of the Dylogic translator solution is that the translation work is much too simplistic for a number of reasons. First, given the needs of the application (color, normal, texture coordinate), the Dylogic solution enables all the client vertex data array pointers for vertex coordinates, color, normal and texture coordinates as well as passes the related arrays to the rendering engine. This means that useless commands and data are used in the solution which might lead to a waste of resources and a dramatic loss of performance. Second, in the Dylogic solution no array states are recorded and restored in the glEnd command. This could present memory problems. Third, the Dylogic solution fails to take into consideration multiple textures.

It is recognized by those skilled in the art that the OpenGL specification defines optional APIs, also called "extensions", which are proposed by graphic companies and sometimes included as core additions in the specification. Most of the recent popular games use part of these extensions. Unfortunately, the Dylogic translator solution does not treat these extensions at all.

In sum, the Dylogic translator solution is an incomplete solution, at best, and is not optimized to be able to run substantially all, if not all, OpenGL applications over a compliant OpenGL|ES implementation. A need accordingly exists in the art for such a translator solution.

SUMMARY OF THE INVENTION

In accordance with an embodiment, a translation process between OpenGL and OpenGL|ES comprises storing global GL states which might be changed by an OpenGL|ES function used during translation, translating to obtain OpenGL APIs by substituting OpenGL|ES commands for OpenGL commands, passing the OpenGL|ES APIs for OpenGL|ES implementation, and restoring the global GL states which were previously stored.

In accordance with another embodiment, a method for translating to OpenGL|ES an automatic Texture-Coordinate Generation using a glTexGen command in OpenGL comprises storing texture coordinate array state and data before translation of the command glTexGen, using information provided in the command glTexGen, deciding which texture coordinate element (s, t, r, q) should be translated and which translation algorithm should be implemented, implementing the chosen translation algorithm to calculate the texture coordinate element (s, t, r q), storing generated texture coordinate data, passing to an OpenGL|ES implementation glEnableClientState and glTexCoordPointer commands which contain the stored texture coordinate data, and restoring the texture coordinate array state and data which were previously stored.

In accordance with yet another embodiment, a method for translating to OpenGL|ES an automatic Texture-Coordinate Generation using a glTexGen command in OpenGL comprises intercepting calls of OpenGL glVertexPointer (or glVertex), glNormalPointer (or glNormal) functions which include a pointer to a vertices attribute data array, saving parameter values for vertices coordinate and normal data, and responsive to the glTexGen command, performing a process for each vertex. That process comprises calculating vertex coordinates in an eye system using a modelview matrix, computing spherical texture coordinates (s, t), activating a texture coordinates array, and sending a pointer array to OpenGL.

A process for translating a glBegin/glEnd paradigm to draw geometrical objects in OpenGL into a vertex array to draw geometrical objects in OpenGL|ES comprises storing GL states and array data, transforming complex primitive quads and polygons in OpenGL into smaller pieces of triangles for drawing in OpenGL|ES, preparing necessary array data for color, normal and texture coordinate with respect to the triangles, rendering the triangles as objects in accordance with the array data in OpenGL|ES, and restoring the previously stored GL states and array data.

In accordance with another embodiment, a method for translating for support by OpenGL|ES an OpenGL API Display list which stores a set of gl commands and drawing commands comprises intercepting a glNewList call to create a display list, creating a dynamic gl command array to store gl commands which are called between glNewList and glEndList, and responsive to a glCallList call in OpenGL to call the display list, executing all the gl commands stored in the dynamic gl command array.

In accordance with another embodiment, a method for translating to OpenGL|ES an OpenGL graphics call specifying three or more textures, wherein OpenGL|ES supports a graphics call specifying no more than two textures, comprises rendering with OpenGL|ES a geometric figure having two of the three or more textures specified by the OpenGL graphics call, and, for each additional texture specified by the OpenGL graphics call, redrawing the geometric figure to be textured in accordance with that additional texture.

In accordance with still another embodiment, a translation method comprises wrapping, during runtime, an OpenGL application with a configurable layer positioned for execution between the OpenGL application and an OpenGL|ES rendering engine, wherein the configurable layer performs an application independent translation of OpenGL APIs and extensions so as to be supported by the OpenGL|ES rendering engine.

BRIEF DESCRIPTION OF THE DRAWINGS

A more complete understanding of the invention may be obtained by reference to the accompanying drawings wherein:

FIG. 6 illustrates an example of a state storage procedure;

FIGS. 10A and 10B illustrate the operation of a pass data array module;

FIG. 14 is a flow diagram illustrating an implementation procedure for spherical mapping;

FIG. 15 is a flow diagram illustrating an implementation procedure for display lists.

DETAILED DESCRIPTION OF THE DRAWINGS

Figure 1:
FIG. 1 is a flow diagram illustrating a prior art OpenGL to OpenGL|ES translator.
Figure 2:
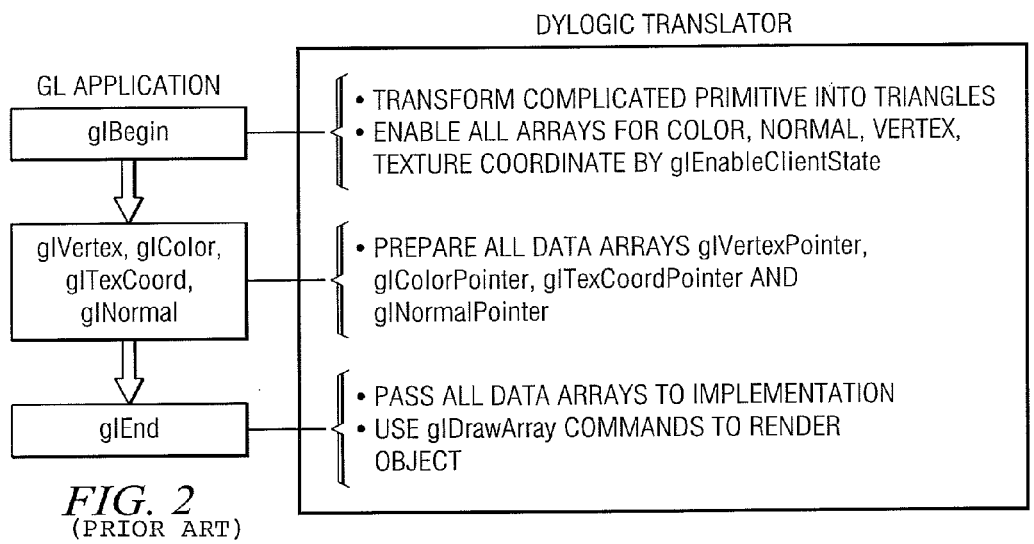
FIG. 2 shows the FIG. 1 prior art translator operation supporting translation of the glBegin/glEnd paradigm.

To address the deficiencies of the prior art, embodiments of the solution wrap, during runtime, the OpenGL application with a small configurable layer between the application and the OpenGL|ES rendering engine. This layer performs an optimized game independent translation of the most commonly used OpenGL APIs and extensions. With this solution, visual performance in OpenGL|ES should offer a similar result as with the native OpenGL graphic system or at least with a very good approximation.

The following notation is used in the drawings and in connection with the description of the embodiments:

ArrV two-dimensional data array for storing position data of vertex elements, size is m×4;

ArrC two-dimensional data array for storing color data of vertex elements, size is m×4;

ArrN two-dimensional data array for storing normal data of vertex elements, size is m×3;

ArrT0 two-dimensional data array for storing the 1st layer texture coordinate data of vertex elements, size is m×2;

ArrT1 two-dimensional data array for storing the 2nd layer texture coordinate data of vertex elements, size is m×2;

normalStateEnable boolean, represents if normal array is enabled.

colorStateEnable boolean, represents if color array is enabled.

tex0StateEnable boolean, represents if texture coordinate array for texture unit 0 is enabled tex1StateEnable boolean, represents if texture coordinate array for texture unit 1 is enabled colorEnable boolean, represents if color data are sent within glBegin/glEnd block;

normalEnable boolean, represents if normal data are sent within glBegin/glEnd block;

texEnable boolean, represents if texture coordinate data are sent within glBegin/glEnd block; and multiTexEnable boolean, represents if multitexture is currently used.

Figure 3:
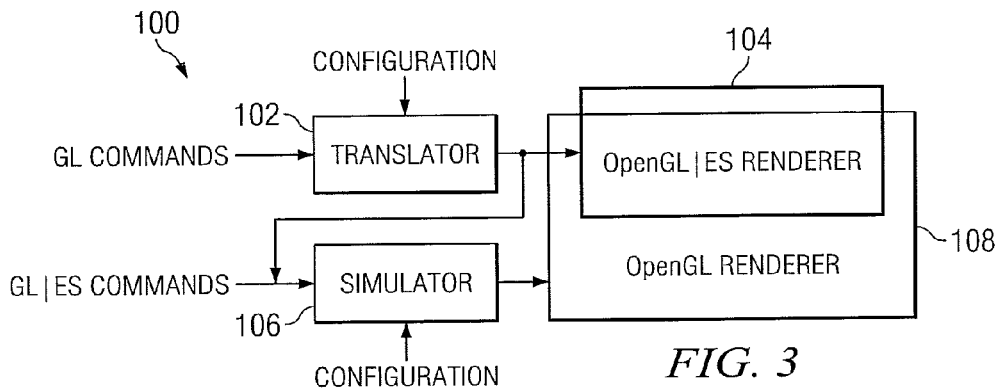
FIG. 3 is a block diagram of an OpenGL|ES translator and simulator system in accordance with an embodiment.

Reference is now made to FIG. 3 wherein there is shown a block diagram of an OpenGL|ES translator and simulator system 100 in accordance with an embodiment. A translator module 102 receives configuration information as well as GL commands and translates OpenGL APIs not supported in OpenGL|ES to supported APIs. The translated APIs are passed on to an OpenGL|ES implementation module (renderer) 104. The system 100 further includes a simulator module 106. The simulator module 106 can receive OpenGL|ES commands either externally or from the output of the translator module 102. An OpenGL implementation module (renderer) 108 receives output from the simulator module 106 thus allowing OpenGL|ES APIs to be simulated on the OpenGL implementation.

Figure 4:
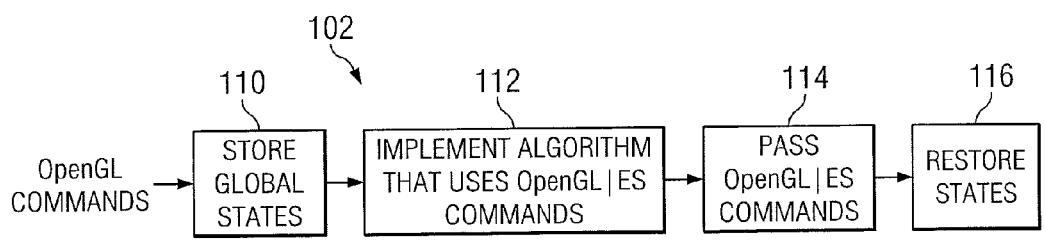
FIG. 4 depicts the process of translation performed by the translator module of FIG. 3.

Reference is now made to FIG. 4 which depicts the process of translation performed by the translator module 102. It is recognized that OpenGL is a state machine. Thus, some APIs might change some GL states and thus influence the rendering result. Therefore, before sending any OpenGL|ES commands, the translator module 102 first stores 110 the global GL states which might be changed by the OpenGL|ES functions used during the translation. The OpenGL APIs are then translated 112 by implementing an algorithm which uses OpenGL|ES commands for those originally implemented in the OpenGL implementation. The new OpenGL|ES APIs are then passed 114 for OpenGL|ES implementation. Lastly, the states that were previously stored 110 are restored 116 in order to conform with a continued execution of the OpenGL application.

A better understanding of the operation of the translator 102 may be obtained by reference to the following examples which explain details of this translation mechanism.

1. Translation of the glBegin/glEnd Paradigm.

Figures 5, 7:
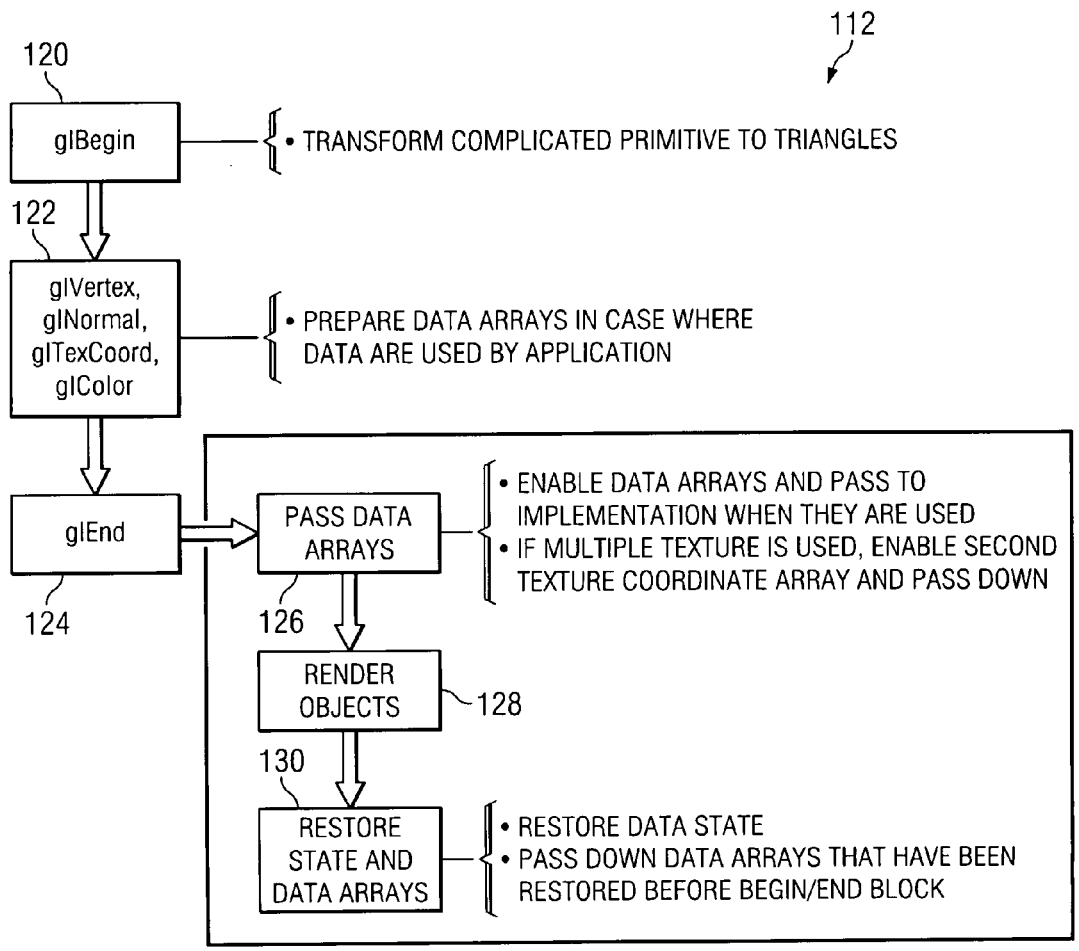
FIG. 5 illustrates a typical piece of code example for the glBegin/glEnd paradigm in OpenGL.
FIG. 7 illustrate the process of translation of the glBegin/glEnd paradigm in accordance with an embodiment.

In OpenGL, it is a common method to use the glBegin/glEnd paradigm to draw geometrical objects. A typical piece of code example for the glBegin/glEnd paradigm is shown in FIG. 5, where a quad is drawn with specific data for each vertex-color, normal, texture coordinate. However, using the glBegin/glEnd paradigm to render objects is not supported at all in OpenGL|ES. If the application is written to utilize the glBegin/glEnd paradigm, it is necessary to translate the glBegin/glEnd block into vertex array before passing the commands into OpenGL|ES pipeline. This translation is performed by translator 102/112.

Vertex array commands, such as glEnableClientState, glVertexArrayPointer, glColorPointer, which are supported in OpenGL|ES are used to render the objects after translation from the glBegin/glEnd paradigm of OpenGL. These vertex array commands will necessarily change some GL states and array data (perhaps adversely with respect to continued application execution following the translation). Thus, these states and data are stored 110 before the translation 112. An example of a state storage 110 procedure is shown in FIG. 6. As described in FIG. 6, colorStateEnable, normalStateEnable, tex0StateEnable, and tex1StateEnable are used to record the current array state. The state storage procedure illustrated in FIG. 6 is straight-forward. Responsive to the glEnableClientState call, color, normal and texture coordinate state storage processing is handled.

The illustrated order is exemplary only. First, with respect to color processing 300, the process tests 302 if the color array is enabled. If no, the process moves on to normal processing 304. If so, the colorStateEnable variable is set to TRUE in step 306 and color client state is enabled in step 308. The process for storage 110 may then return 310 to the application. In the normal processing 304, the process tests 312 if the normal array is enabled. If no, the process moves on to texture coordinate processing 314. If so, the normalStateEnable variable is set to TRUE in step 316 and normal client state is enabled in step 318. The process for storage 110 may then return 310 to the application. Lastly, in texture coordinate processing 314, the process tests 322 if the normal array is enabled. If no, the process for storage 110 may then return 310 to the application. If so, the process tests 324 if layer 0 is texture active. If yes, the tex0StateEnable variable is set to TRUE in step 326 and texture coordinate client state is enabled in step 328. If no in step 324, the process tests 334 if layer 1 is texture active. If yes, the tex1StateEnable variable is set to TRUE in step 336 and texture coordinate client state is enabled in step 328. If no in test 334, the process for storage 110 may then return 310 to the application.

Figure 8:
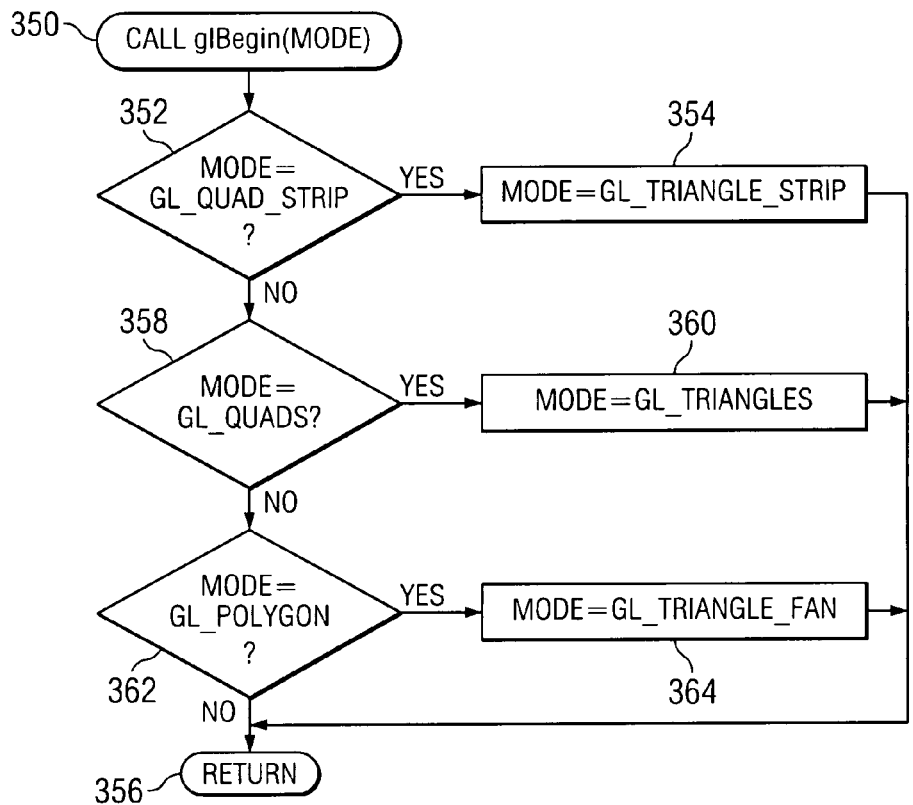
FIG. 8 illustrates a process for the transformation of complicated primitives to triangles.

After state and data are stored 110, a translation (by translator 112) of the glBegin/glEnd paradigm can be implemented as shown in FIG. 7. At module 120 "glBegin (mode)", complicated primitives are transformed to triangles. The details of this transformation performed by module 120 "glBegin (mode)" is shown in FIG. 8. In OpenGL|ES, complex primitive types such as quads and polygons are not supported. Thus, if quads and polygons are indicated by "mode", these primitive need to be "broken" down into smaller pieces of triangles for drawing in OpenGL|ES. FIG. 8 illustrates how the parameter of glBegin "mode" is changed based on the OpenGL quads and polygons identification. As shown, and in response to the glBegin(mode) call 350, in transform module 120, a test is made in step 352 as to whether the "mode" is a GL_QUAD_STRIP. If so, the OpenGL mode designation of GL_QUAD_STRIP is changed in step 354 to GL_TRIANGLE_STRIP, and the process returns 356. If no in test 352, the process next tests in step 358 as to whether the "mode" is GL_QUADS. If so, the OpenGL mode designation of GL_QUADS is changed in step 360 to GL_TRIANGLES, and the process returns 356. If no in test 358, the process next tests in step 362 as to whether the "mode" is GL_POLYGON. If so, the OpenGL designation of GL_POLYGON is changed in step 364 to GL_TRIANGLE_FAN, and the process returns 356. In this way, the OpenGL complicated primitives based on quads and polygons are transformed to triangles which are supported for drawing in OpenGL|ES.

Figure 9:
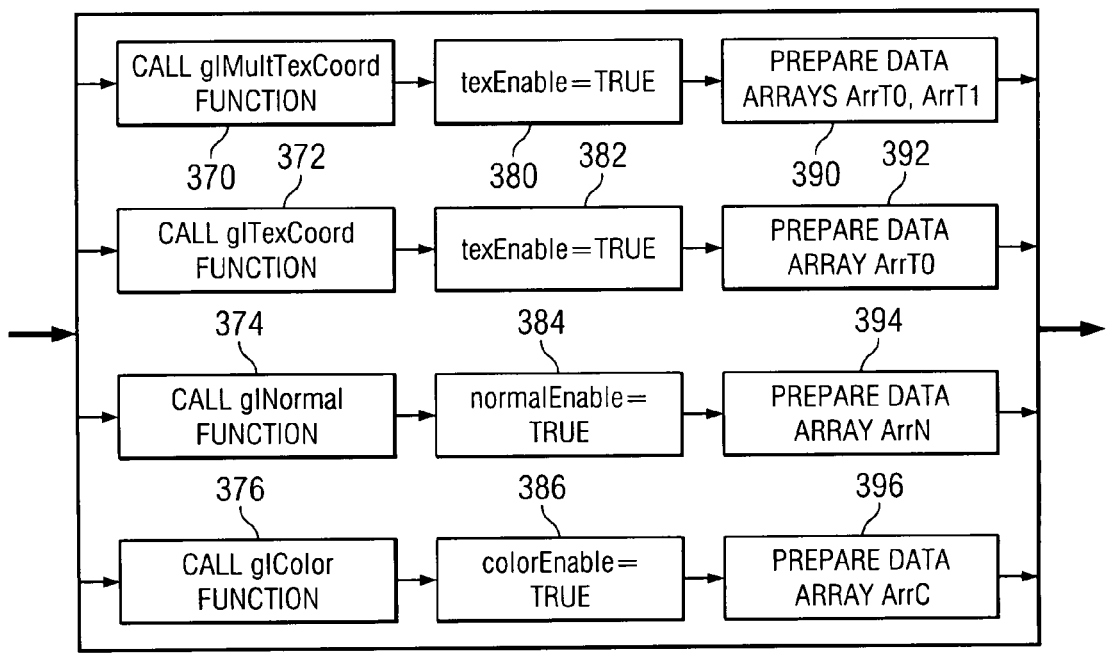
FIG. 9 illustrates a process for preparation of array data for color, normal and texture coordinate.

With reference once again to FIG. 7, after the transform 120 (shown in detail in FIG. 8), the translation 112 uses a preparation module 122. In module 122, array data for color, normal and texture coordinate are prepared in case they are used by the application. The preparation activities are illustrated in more detail in FIG. 9. These array data are collected from the commands glVertex, glColor, glNormal and glTexcoord and stored in arrays ArrV, ArrC, ArrN, ArrT0, respectively. In the event multiple texture is used, the second layer texture coordinates array data are collected from command glMultiTexCoord and stored in array ArrT1. For example, the preparation module 122 responds to calls of one or more of: the glMultTexCoord function 370, glTexCoord function 372, glNormal function 374 and glColor function 376. Responsive thereto, the states for texEnable, normalEnable, and colorEnable are set TRUE in steps 380-386, in comparison to calls 370-376, respectively, in order to make sure the proper data arrays are used. This assists in helping ensure that only useful commands are passed to the OpenGL|ES implementation. Then, the proper data arrays are prepared. For multiple textures, responsive to the glMultTexCoord function 370 call, the data arrays ArrT0 and ArrT1, as discussed above, are prepared in step 390. For single texture, responsive to the glTexCoord function 372 call, the data array ArrT0, as discussed above, is prepared in step 392. For normal, responsive to the glNormal function 374 call, the data array ArrN, as discussed above, is prepared in step 394. Lastly, for color, responsive to the glColor function 376 call, the data array ArrC, as discussed above, is prepared in step 396.

Figure 10B:
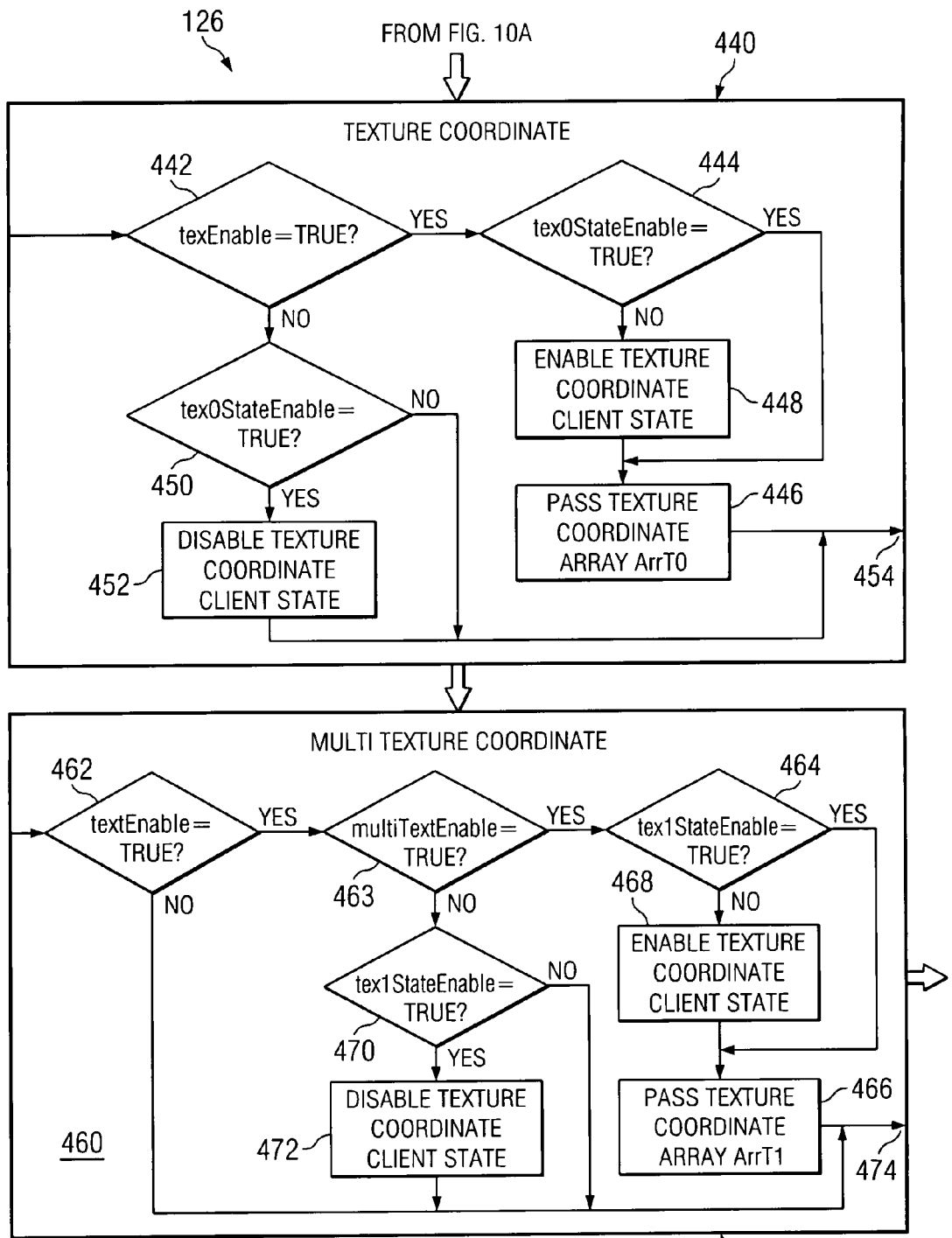

Following preparation in step 122, the translation process of module 124 "glEnd" (FIG. 7) is performed. Module 124 includes three modules: a pass data array module 126; a render objects module 128; and a restore data and states module 130. In the process 126, all useful array states are enabled and useful array data are passed to the implementation. The operation of the pass data array module 126 is explained in detail in FIGS. 10A and 10B.

With respect to color processing 400, a test is made in step 402 as to whether colorEnable is TRUE. If so, a test is made in step 404 as to whether colorStateEnable is TRUE. If so, then the color array ArrC (FIG. 9, step 396) is passed in step 406. If no in step 404, then the color client state is enabled in step 408, and the color array ArrC (FIG. 9, step 396) is passed in step 406. If no in step 402, a test is made in step 410 as to whether colorStateEnable is TRUE. If so, then the color client state is disabled in step 412. If no in step 410, or following steps 406 or 412, the process for color terminates 414, and operation of the pass data array module 126 continues.

With respect to normal processing 420, a test is made in step 422 as to whether normalEnable is TRUE. If so, a test is made in step 424 as to whether normalStateEnable is TRUE. If so, then the normal array ArrN (FIG. 9, step 394) is passed in step 426. If no in step 424, then the normal client state is enabled in step 428, and the normal array ArrN (FIG. 9, step 394) is passed in step 426. If no in step 422, a test is made in step 430 as to whether normalStateEnable is TRUE. If so, then the normal client state is disabled in step 432. If no in step 430, or following steps 426 or 432, the process for color terminates 434, and operation of the pass data array module 126 continues.

With respect to texture processing 440, a test is made in step 442 as to whether textEnable is TRUE. If so, a test is made in step 444 as to whether tex0StateEnable is TRUE. If so, then the texture coordinate array ArrT0 (FIG. 9, step 392) is passed in step 446. If no in step 444, then the texture coordinate client state is enabled in step 448, and the texture coordinate array ArrT0 (FIG. 9, step 392) is passed in step 426. If no in step 442, a test is made in step 450 as to whether tex0StateEnable is TRUE. If so, then the texture coordinate client state is disabled in step 452. If no in step 450, or following steps 446 or 452, the process for texture terminates 454, and operation of the pass data array module 126 continues.

With respect to multiple texture processing 460, a test is made in step 462 as to whether textEnable is TRUE. If so, a test is made in step 463 as to whether multitextEnable is TRUE. If so, a test is made in step 464 as to whether tex1StateEnable is TRUE. If so, then the texture coordinate array ArrT1 (FIG. 9, step 390) is passed in step 466. If no in step 464, then the texture coordinate client state is enabled in step 468, and the texture coordinate array ArrT1 (FIG. 9, step 390) is passed in step 466. If no in step 463, a test is made in step 470 as to whether tex1StateEnable is TRUE. If so, then the texture coordinate client state is disabled in step 472. If no in step 470, or no in step 462, or following steps 466 or 472, the process for texture terminates 474, and operation of the pass data array module 126 continues.

For a more complete understanding of the process performed by the module 126, consider as an example how this module passes color information (see, color processing 400). Suppose that the command glColor is called by the application in module 122 (FIG. 7). If so, then the state variable "colorEnable" is set TRUE (see, FIG. 9). In this case, the command glEnableClientState (GL_COLOR_ARRAY) should be passed to the implementation. In order to avoid passing redundant commands, it is better to check if state variable colorStateEnable is also TRUE (this state variable has been recorded in FIG. 6). If this state is TRUE, then it is not necessary to send the command glEnableClientState (GL_COLOR_ARRAY) as it has been sent before the glBegin/glEnd paradigm being evaluated in FIG. 7. If we instead suppose that the command glColor has not been called by the application in module 122, in which case the state variable "colorEnable" is set FALSE, then it is not necessary to pass command glEnableClientState (GL_COLOR_ARRAY) to implementation. However, if the recorded state variable colorStateEnable is TRUE, then command glDisableClientState (GL_COLOR_ARRAY) should be used to prevent the color information specified for other objects from influencing the rendering result of the glBegin/glEnd paradigm.

The processes 420, 440 and/or 460 relating to other information concerning normal and texture coordinates (as shown in FIG. 10) generally share the same translation procedure as with the color information example just provided.

With reference once again to FIG. 7, after all the useful array state and data are enabled and passed to implementation (module 126), it is time to render the object(s) using the commands glDrawArray or glDrawElements. This task is carried out by the render objects module 128.

Figure 11A:
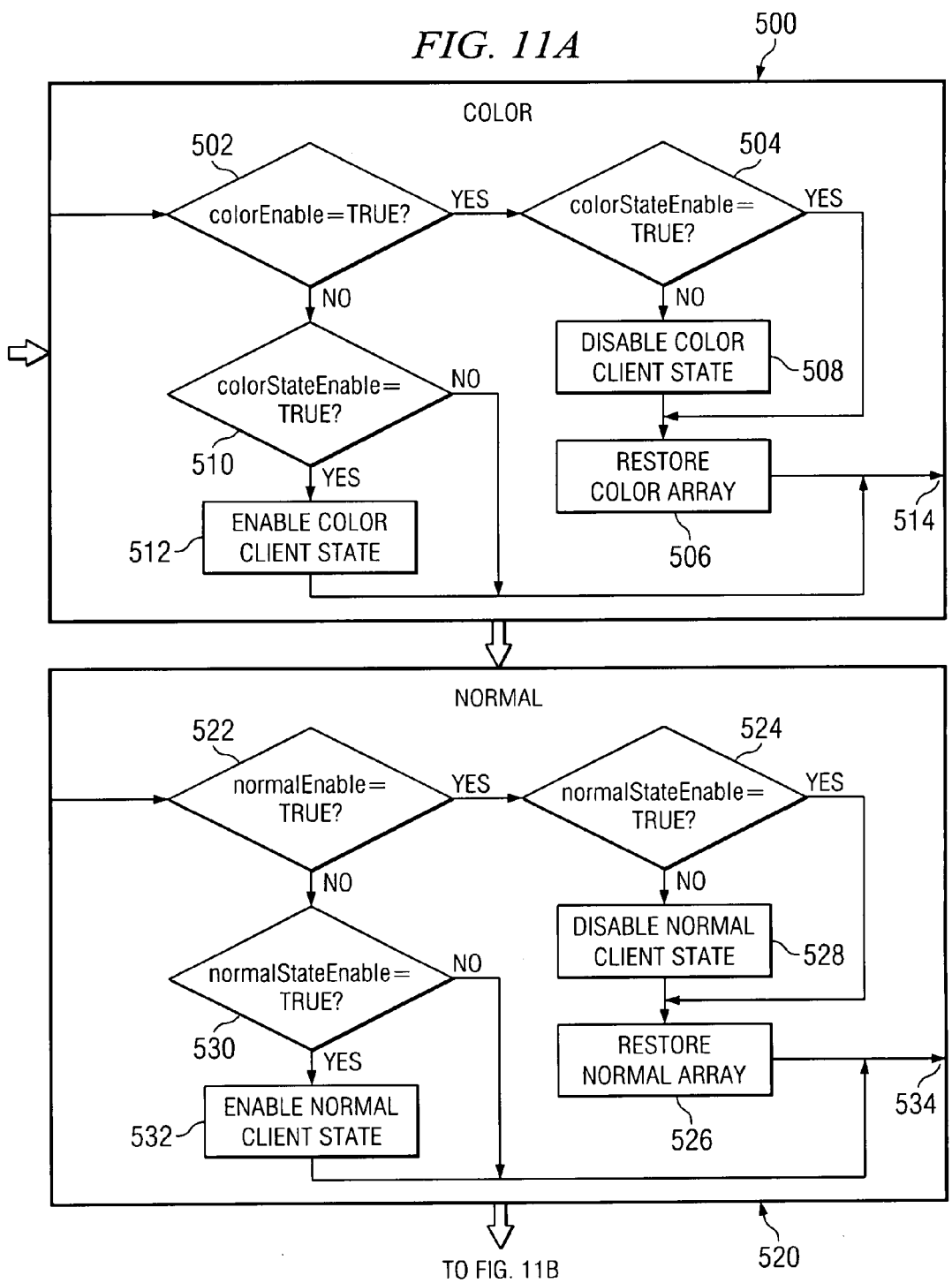
FIGS. 11A and 11B illustrate a process for restoring states and data after object rendering.
Figure 11B:
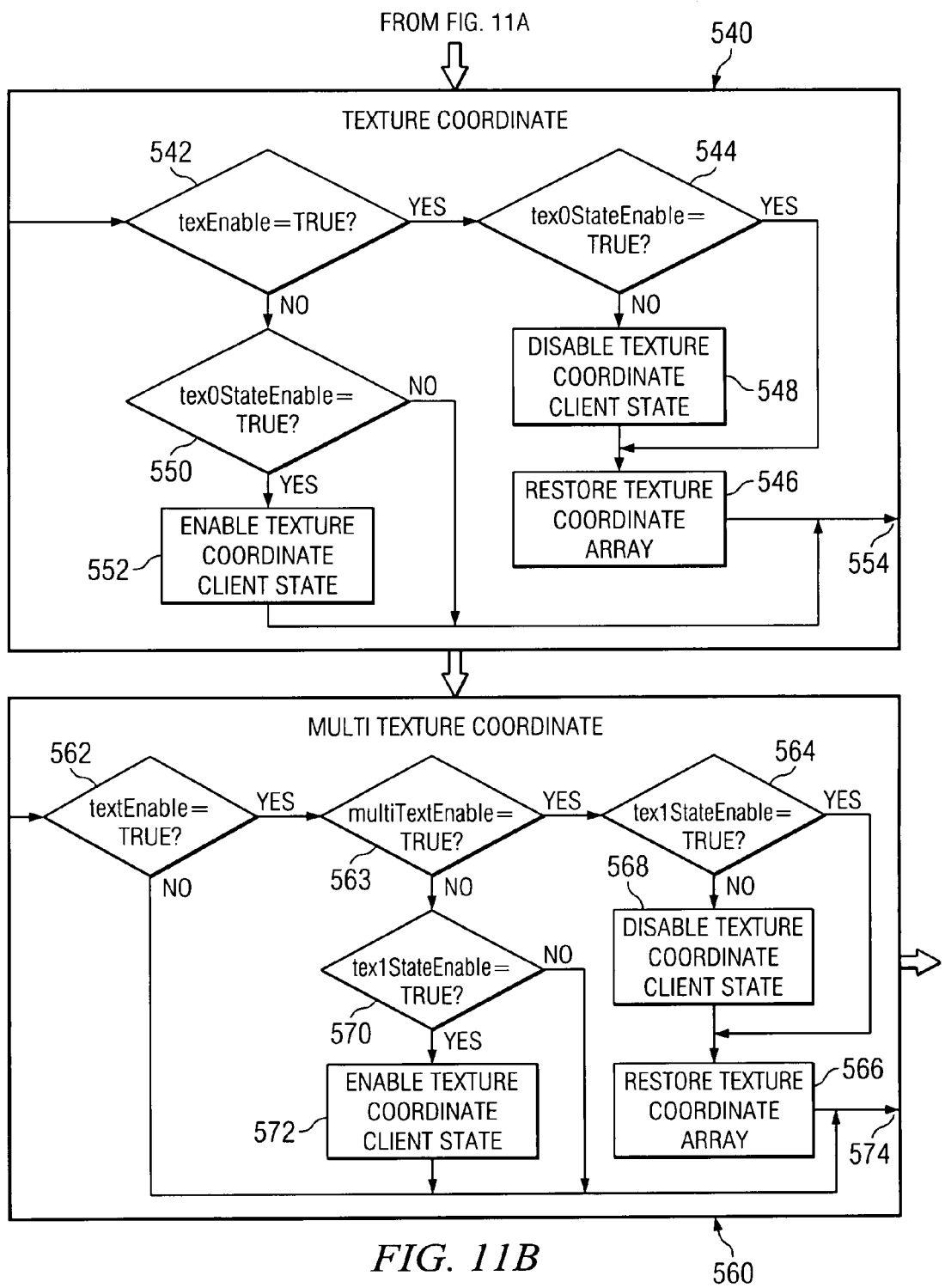

After rendering the objects, the states and data should be restored by the restore data and states module 130. The operation of the module 130 is explained in detail in FIGS. 11A and 11B.

With respect to color processing 500, a test is made in step 502 as to whether colorEnable is TRUE. If so, a test is made in step 504 as to whether colorStateEnable is TRUE. If so, then the data for the color array ArrC is restored in step 506. If no in step 504, then the color client state is disabled in step 508, and the color array ArrC is restored in step 506. If no in step 502, a test is made in step 510 as to whether colorStateEnable is TRUE. If so, then the color client state is enabled in step 512. If no in step 510, or following steps 506 or 512, the process for color terminates 514, and operation of the restore module 130 continues.

With respect to normal processing 520, a test is made in step 522 as to whether normalEnable is TRUE. If so, a test is made in step 524 as to whether normalStateEnable is TRUE. If so, then the data for normal array ArrN is restored in step 526. If no in step 524, then the normal client state is disabled in step 528, and the data for the normal array ArrN is restored in step 526. If no in step 522, a test is made in step 530 as to whether normalStateEnable is TRUE. If so, then the normal client state is enabled in step 532. If no in step 530, or following steps 526 or 532, the process for color terminates 534, and operation of the restore module 130 continues.

With respect to texture processing 540, a test is made in step 542 as to whether textEnable is TRUE. If so, a test is made in step 544 as to whether tex0StateEnable is TRUE. If so, then the data for the texture coordinate array ArrT0 is restored in step 546. If no in step 544, then the texture coordinate client state is enabled in step 548, and the data for the texture coordinate array ArrT0 is restored in step 526. If no in step 542, a test is made in step 550 as to whether tex0StateEnable is TRUE. If so, then the texture coordinate client state is enabled in step 552. If no in step 550, or following steps 546 or 552, the process for texture terminates 554, and operation of the restore module 130 continues.

With respect to multiple texture processing 560, a test is made in step 562 as to whether textEnable is TRUE. If so, a test is made in step 563 as to whether multitextEnable is TRUE. If so, a test is made in step 564 as to whether tex1StateEnable is TRUE. If so, then the data for the texture coordinate array ArrT1 is restored in step 566. If no in step 564, then the texture coordinate client state is disabled in step 568, and the data for the texture coordinate array ArrT1 is restored in step 566. If no in step 563, a test is made in step 570 as to whether tex1StateEnable is TRUE. If so, then the texture coordinate client state is enabled in step 572. If no in step 570, or no in step 562, or following steps 566 or 572, the process for texture terminates 574, and operation of the restore module 130 continues.

A more complete understanding of the process performed by the module 130 may be obtained by considering as an example how this module restores color information (see, color processing 500). Thus, with respect to the previous example concerning color information, if the state variable "colorEnable" is TRUE, but the stored state variable "colorStateEnable" is FALSE, then in this case glDisableClientState (GL_COLOR_ARRAY) should be used in order to keep accordance with the state specified before the glBegin/glEnd paradigm.

The processes 520, 540 and/or 560 relating to other information concerning normal and texture coordinates (as shown in FIG. 11) generally share the same restoration procedure as with the color information example just provided.

2. Array Element

In order to reduce the number of function calls overhead inside a glBegin/End block, it is possible with OpenGL to use Arrays for sending the vertices attributes to OpenGL using the function glArrayElement( ). Unfortunately, the function glArrayElement( ) is not supported by OpenGL|ES because the immediate mode is not supported.

Figure 13:
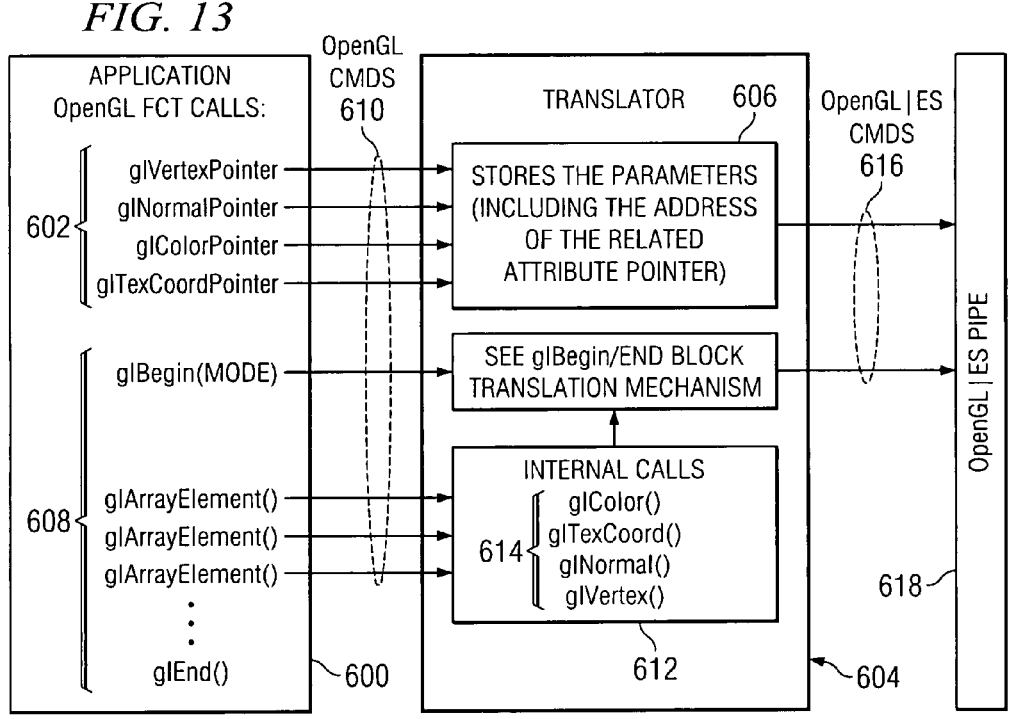
FIG. 13 is a flow diagram illustrating an implementation procedure for array element.

FIG. 13 shows a mechanism for array element translation in accordance with an embodiment. The application 600 must first send 602 to OpenGL the pointer to the vertices attribute data array by calling the OpenGL functions glVertexPointer, glNormalPointer, glColorPointer, glTexCoordPointer. The translator 604 intercepts these calls (reference 602) and saves 606 the parameters values (including the address of the related attribute pointer). Then, inside the glBegin/End blocks 608, the translator 604 replaces 612 each of the calls 610 for glArrayElement( ) with calls 614 to glVertex, glColor, glNormal and glTexcoord and finishes the translation using the previously described Translation of glBegin/glEnd paradigm (see, FIG. 7). The resulting OpenGL|ES commands 616 are then passed to the OpenGL|ES pipe 618 for execution.

3. Automatic Texture-Coordinate Generation

In OpenGL, the texture coordinate can be specified by the command glTexCoord and texture coordinate arrays, it can also be generated automatically by the command glTexGen. Many existing OpenGL games use this automatic Texture-Coordinate Generation mechanism. However, the automatic texture generation process is not supported in OpenGL|ES. In accordance with an embodiment, a process is provided to allow support of these texture generation algorithms in OpenGL|ES.

Figure 12:
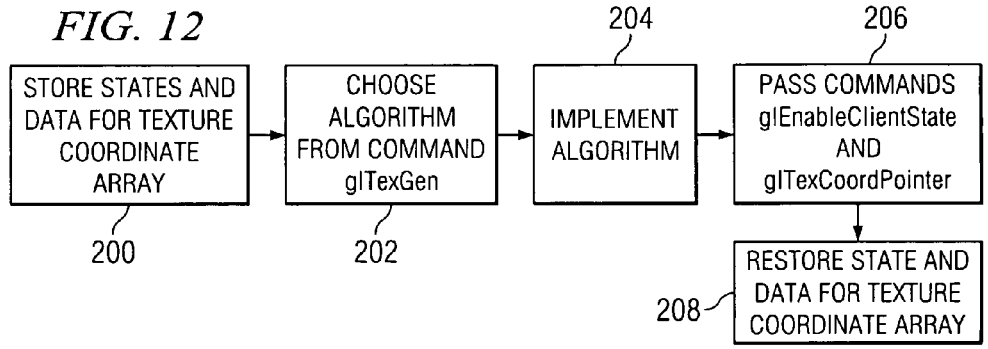
FIG. 12 is a flow diagram illustrating an implementation procedure for texture generation.

OpenGL utilizes several algorithms such as sphere map, object linear, eye linear, and the like, in texture generation. Since OpenGL|ES only supports vertex array, the texture coordinate array is used to store the texture coordinate data generated by the generation algorithm. An exemplary implementation procedure is shown in FIG. 12.

In step 200, the texture coordinate array state and data are stored before translation of glTexGen. More specifically, this state information is stored in the manner shown in FIG. 6.

Next, in step 202, the process decides which element (s, t, r, q) of the texture coordinate should be translated, and which algorithm should be implemented. The decision is made using the information provided in the command glTexGen. In this step, the process also decides which texture object is needed to generate the texture coordinate since multiple textures might be used to apply to one object.

In step 204, the process implements the chosen algorithm and calculates the texture coordinate (s, t, r q). The texture coordinates data is then stored into the texture coordinates array.

Next, in step 206, the process passes to the OpenGL|ES implementation two commands: glEnableClientState (GL_TEXTURE_COORD_ARRAY) and glTexCoordPointer with the texture coordinate data prepared in step 202.

Lastly, in step 208, the process restores the texture coordinate states and data which were previously stored according to step 200.

With reference now to FIG. 14, an illustration is provided of a mechanism to allow support of a texture generation algorithm in OpenGL|ES for the case of sphere mapping. The application 600 must first send 622 to OpenGL the pointer to the vertices attribute data array by calling the OpenGL functions glVertexPointer (or glVertex), glNormalPointer (or glNormal). The translator 604 intercepts these calls (reference 622) and saves 626 and 628 the parameters values for the vertices coordinate and normal data, respectively. Then, with respect to the glTexGen command 630, the translator 604 performs the following process for each vertex 632. First, the vertex coordinates are calculated in the eye system using a modelview matrix (step 634). Next, in step 636, the spherical texture coordinates (s, t) are computed. Lastly, the texture coordinates array is activated and the pointer array is sent to OpenGL in step 638. The resulting OpenGL|ES commands 640 are then passed to the OpenGL|ES pipe 618 for execution.

4. Display List

The OpenGL API Display lists allow for the storing of a set of gl commands and drawing commands. More specifically, the set of gl commands and drawing commands are pre-computed and stored by OpenGL. This Display lists API thus allows for saving some computation time when rendering an object several times. Unfortunately, this API is not supported by OpenGL|ES.

Reference is now made to FIG. 15 which depicts the translation mechanism of display lists in accordance with an embodiment. The translator 604 does not aim to pre-compute the gl commands in the display list as a typical OpenGL implementation would do. Instead, the translator 604 saves the commands with their parameter values in order to recall them when the display list is called by glCallList. The operation of the translation is as follows: when the application 600 calls 650 glNewList in order to create a display list, the translator 604 creates 652 internally a dynamic array of gl commands (a link table) that will be used to store 658 the gl commands 656 that will be called between glNewList 650 and glEndList 654. It also activates an internal flag specifying that, when a gl command 656 that can be stored 658 into a display list is called by the application 600, the translator 604 just stores 658 the gl command 656 with the value of each parameter into the internal gl command array (the link table). Later, each time the application 600 calls glCallList 660 to call the display list, the translator 604 will call (i.e., execute) 662 all the gl commands stored in the associated internal gl command array (link table). The resulting OpenGL|ES commands 670 are then passed to the OpenGL|ES pipe 618 for execution. Responsive to the OpenGL glDeleteList call 664 by the application 600, the translator 604 deletes 668 the link table.

5. Multi Texture

Since OpenGL (version 1.2) it is possible to apply several textures on the same polygon using several texture units. However, OpenGL|ES (version 1.1) only supports the use of a maximum of two texture units. An embodiment handles the situation where the application makes use of more than two texture units, which is often the case in the new OpenGL commercial games (such as Quake 3).

Figure 16:
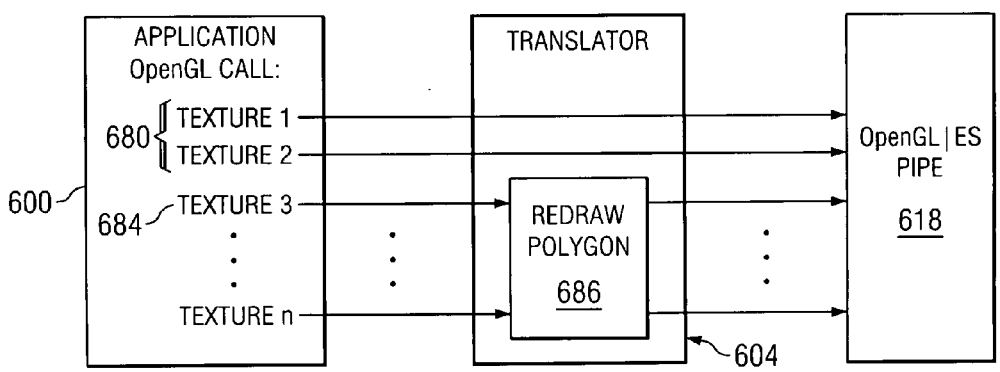
FIG. 16 is a flow diagram illustrating an implementation procedure for multiple texture generation.

Reference is now made to FIG. 16. Suppose that OpenGL|ES supports only two texture units. The translator 604, responsive to the specified two (first) textures 680, would generate the OpenGL|ES commands 682 to cause a polygon to be rendered with the two (first) textures 680 in accordance with the normal operation of OpenGL|ES. If, however, a third layer 684 of texture is requested by the application 600 in OpenGL, the translator 604 operates to redraw 686 the same polygon to be textured with the third texture 684. The appropriate OpenGL|ES commands 682 to cause the redrawn polygon to be rendered are accordingly issued by the translator 604. The same operation can be repeated for any further texture layers (up to layer n) requested by the application 600 in OpenGL.

It is recognized that several hundred of OpenGL APIs exist. Several examples of how the concepts herein can be used to support such APIs in the OpenGL|ES environment have been provided above. The general translation procedure which may be used with respect to any of the OpenGL APIs is shown in FIG. 4 (as described above).

In comparison to those APIs which have been translated using the Dylogic solution, the translator in accordance with embodiments herein provides an optimized result which is more reasonable and complete than with the prior art. In comparison, for example, for translation of the Begin/End paradigm, two new steps 126 and 130 are added into "End" command translation 124.

Using the process of FIG. 4, applicants have translated about 70% of the OpenGL APIs (including such APIs as Display list (see above), automatic texture coordinate generation (see above), PushAttribts and PopAttributs, light family, material family, support for more texture internal format, support for more complex data types, support for complex primitives). It is noted that the remaining 30% of the OpenGL APIs are very seldom used by applications.

The translator according to embodiments herein also supports many extensions like arb_multitexture, ext_texture_compression_s3tc, ext_compiled_vertex_array, arb_texture_cube_map, and the like.

The translator according to embodiments herein has proven its efficiency by being able to successfully run a wide range of modern and complex 3D OpenGL games over different compliant OpenGL|ES implementations. In most cases, the visual results are exactly or nearly exactly the same as if they were rendered with a real OpenGL rendering engine. For some others, the differences are almost imperceptible for the player during game play. For example, the translator has been successfully tested with the following games: Quake 1, Quake 2, Quake 3, Tread Mark and Return To Castle Wolfenstein. All of these games use begin/end block and multiple texture extension, and further run properly in OpenGL|ES without any noticeable distracting artifacts. The translator has also been successfully tested with TuxRacer, which uses texture coordinate generation and compiled vertex array extension, and runs properly without any noticeable distracting artifacts. The translator has also been successfully tested with Doom3, which uses cube map extension and multiple texture extensions, and can work over OpenGL|ES implementation with very limited differences. The translator has also been successfully tested with No Limits Roller Coaster, which uses display list, and works very well. The translator has also been successfully tested with OglVillage, which uses PushAttrib, PopAttrib and S3TC compressed texture extension, and works substantially perfectly.

By this mechanism of translation, more APIs and extensions can be supported, and therefore more games and applications can run over OpenGL|ES implementations.

Comparing with the prior Dylogic solution, a solution is presented that is a more complete OpenGL to OpenGL|ES translator: many more OpenGL games can work over any compliant OpenGL|ES implementation through the present translator. The solution is also more optimized since the mechanisms of translation are game independent and cover all the most common cases.

In addition, the solution offers a number of advantages such as:

Advantage 1: With this solution it is possible to port immediately an OpenGL application for PC to mobile devices by doing a runtime translation of the commands issued by the application into OpenGL|ES commands. Thus, it is not necessary to recompile the application.

Advantage 2: By being between the application and the rendering engine, the translator can act as a configurable filter, which allows a runtime reduction of the complexity of the scene to render. For example, since the screen on a mobile device is much smaller than a PC screen, it is possible to consider decreasing by a given percentage the number of triangles in the mesh of the models to render, or the resolution of the textures and thus decrease the number of computation to be done by the graphic engine to save time and power.

Advantage 3: The OpenGL|ES simulator is a powerful tool for those who want to develop OpenGL|ES applications for mobile phones. Indeed, since applications for mobile devices are usually developed on workstations or PCs, the OpenGL|ES simulator allows a very fast and convenient way to simulate the OpenGL|ES rendering directly on the PC and thus accelerate the debugging phases.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A translation method, comprising:
   wrapping, during runtime, an OpenGL application with a configurable layer positioned for execution between the OpenGL application and an OpenGL|ES rendering engine, wherein the configurable layer performs an application independent translation of OpenGL APIs and extensions so as to be supported by the OpenGL|ES rendering engine;
   wherein wrapping comprises storing global GL states which might be changed by any OpenGL|ES functions used during the application independent translation and then restoring the global GL states following OpenGL|ES rendering so as to conform with continued execution of the OpenGL application;

wherein the wrapping, with respect to the application independent translation, further comprises substituting OpenGL|ES commands for OpenGL commands and passing OpenGL|ES APIs for OpenGL|ES implementation; and wherein substituting comprises, with respect to an automatic Texture-Coordinate Generation operation using a glTexGen command in OpenGL, performing the following process for each vertex:
calculating vertex coordinates in an eye system using a modelview matrix;
computing spherical texture coordinates (s, t);
activating a texture coordinates array; and
sending a pointer array to OpenGL.

2. The method of claim 1 wherein substituting comprises transforming complex primitive quads and polygons in OpenGL into smaller pieces of triangles for drawing in OpenGL|ES.

3. The method of claim 1 wherein substituting comprises, with respect to an automatic Texture-Coordinate Generation operation using a glTexGen command in OpenGL, calculating a texture coordinate element, storing generated texture coordinate data, and passing to an OpenGL|ES implementation glEnableClientState and glTexCoordPointer commands which contain the stored texture coordinate data.

4. The method of claim 3 further comprising, using information provided in the command glTexGen, deciding which texture coordinate element (s, t, r, q) should be translated and which translation algorithm should be implemented, wherein deciding further comprises deciding which texture object is needed to generate the texture coordinate.

5. The method of claim 3 wherein the OpenGL|ES implementation supports vertex array.

6. The method of claim 1 further comprising passing to an OpenGL|ES implementation glEnableClientState and glTexCoordPointer commands which contain data from the texture coordinate array.

7. The method of claim 6 wherein the OpenGL|ES implementation supports vertex array.

8. A method comprising:
wrapping, during runtime, an OpenGL application with a configurable layer positioned for execution between the OpenGL application and an OpenGL|ES rendering engine, wherein the configurable layer performs an application independent translation of OpenGL APIs and extensions so as to be supported by the OpenGL|ES rendering engine;
wherein wrapping comprises storing global GL states which might be changed by any OpenGL|ES functions used during the application independent translation and then restoring the global GL states following OpenGL|ES rendering so as to conform with continued execution of the OpenGL application;
wherein the wrapping, with respect to the application independent translation, further comprises substituting OpenGL|ES commands for OpenGL commands and passing OpenGL|ES APIs for OpenGL|ES implementation; and
wherein substituting comprises, with respect to an OpenGL API Display list which stores a set of gl commands and drawing commands:
intercepting a glNewList call to create a display list;
creating a dynamic gl command array to store gl commands which are called between glNewList and glEndList; and
responsive to a glCallList call in OpenGL to call the display list, executing all the gl commands stored in the dynamic gl command array.

9. The method of claim 8 wherein creating further comprises setting a flag which specifies that, for each called gl command that can be stored into the display list, storing just the gl command with parameter values into the dynamic gl command array.

10. The method of claim 8 wherein creating saves the gl commands with parameter values in order to recall them when the display list is called by glCallList.

11. The method of claim 8 further comprising, responsive to an OpenGL glDeleteList call, deleting the dynamic gl command array.

12. A method comprising:
wrapping, during runtime, an OpenGL application with a configurable layer positioned for execution between the OpenGL application and an OpenGL|ES rendering engine, wherein the configurable layer performs an application independent translation of OpenGL APIs and extensions so as to be supported by the OpenGL|ES rendering engine;
wherein wrapping comprises storing global GL states which might be changed by any OpenGL|ES functions used during the application independent translation and then restoring the global GL states following OpenGL|ES rendering so as to conform with continued execution of the OpenGL application;
wherein the wrapping, with respect to the application independent translation, further comprises substituting OpenGL|ES commands for OpenGL commands and passing OpenGL|ES APIs for OpenGL|ES implementation; and
wherein substituting comprises, with respect to an OpenGL graphics call specifying three or more textures, wherein OpenGL|ES supports a graphics call specifying no more than two textures:
rendering with OpenGL|ES a geometric figure having two of the three or more textures specified by the OpenGL graphics call; and
for each additional texture specified by the OpenGL graphics call, redrawing the geometric figure to be textured in accordance with that additional texture.

13. A method comprising:
wrapping, during runtime, an OpenGL application with a configurable layer positioned for execution between the OpenGL application and an OpenGL|ES rendering engine, wherein the configurable layer performs an application independent translation of OpenGL APIs and extensions so as to be supported by the OpenGL|ES rendering engine;
wherein wrapping comprises storing global GL states which might be changed by any OpenGL|ES functions used during the application independent translation and then restoring the global GL states following OpenGL|ES rendering so as to conform with continued execution of the OpenGL application;
wherein the wrapping, with respect to the application independent translation, further comprises substituting OpenGL|ES commands for OpenGL commands and passing OpenGL|ES APIs for OpenGL|ES implementation; and
wherein substituting comprises translating a glBegin/glEnd paradigm to draw geometrical objects in OpenGL into a vertex array to draw geometrical objects in OpenGL|ES, said translating comprising:

storing GL states and array data;
transforming complex primitive quads and polygons in OpenGL into smaller pieces of triangles for drawing in OpenGL|ES;
preparing necessary array data for color, normal and texture coordinate with respect to the triangles;
rendering the triangles as objects in accordance with the array data in OpenGL|ES; and
restoring the previously stored GL states and array data.

14. The method of claim 13 wherein transforming complex primitive quads and polygons comprises testing whether a mode for OpenGL is a GL_QUAD_STRIP, and if so, changing the OpenGL GL_QUAD_STRIP mode to a GL_TRIANGLE_STRIP mode in OpenGL|ES.

15. The method of claim 13 wherein transforming complex primitive quads and polygons comprises testing whether a mode for OpenGL is GL_QUADS, and if so, changing the OpenGL GL_QUADS mode to a GL_TRIANGLES mode in OpenGL|ES.

16. The method of claim 13 wherein transforming complex primitive quads and polygons comprises testing whether a mode for OpenGL is GL_POLYGON, and if so, changing the OpenGL GL_POLYGON mode to a GL_TRIANGLE_FAN mode in OpenGL|ES.

17. The method of claim 13 wherein preparing comprises collecting array data from OpenGL commands glVertex, glColor, glNormal and glTexcoord.

18. The method of claim 13 wherein rendering comprises rendering the triangles using OpenGL|ES glDrawArray or glDrawElements commands.

19. The method of claim 13 further comprising:
intercepting an OpenGL pointer to a vertices attribute data array;
saving parameter values relating to the intercepted pointer; and
within the glBegin/glEnd paradigm, replacing each OpenGL call for glArrayElement( ) with an OpenGL|ES supported call to glVertex, glColor, glNormal and glTexcoord.

* * * * *

UNITED STATES PATENT AND TRADEMARK OFFICE
CERTIFICATE OF CORRECTION

PATENT NO.       : 8,347,275 B2
APPLICATION NO.  : 11/788395
DATED            : January 1, 2013
INVENTOR(S)      : Christophe Quarre et al.

It is certified that error appears in the above-identified patent and that said Letters Patent is hereby corrected as shown below:

At column 6, line number 56, please replace [glMuLtTexCoord] with

-- glMultiTexCoord --.

Signed and Sealed this
Nineteenth Day of February, 2013

Teresa Stanek Rea
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 8,347,275 B2 | Page 1 of 1 |
| APPLICATION NO. | : 11/788395 | |
| DATED | : January 1, 2013 | |
| INVENTOR(S) | : Christophe Quarre et al. | |

It is certified that error appears in the above-identified patent and that said Letters Patent is hereby corrected as shown below:

On the Title Page:

Item [73] should read

(73) Assignee: STMicroelectronics R&D (Shanghai) Co. Ltd., Shanghai, CHINA

Signed and Sealed this
Twenty-first Day of May, 2013

Teresa Stanek Rea
*Acting Director of the United States Patent and Trademark Office*